United States Patent
Kubo et al.

(10) Patent No.: US 10,412,236 B2
(45) Date of Patent: Sep. 10, 2019

(54) INFORMATION PROCESSING APPARATUS, INFORMATION PROCESSING METHOD, AND NON-TRANSITORY COMPUTER-READABLE STORAGE MEDIUM

(71) Applicants: Shuko Kubo, Kanagawa (JP); Kazunori Hoshi, Tokyo (JP)

(72) Inventors: Shuko Kubo, Kanagawa (JP); Kazunori Hoshi, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 14 days.

(21) Appl. No.: 15/725,376

(22) Filed: Oct. 5, 2017

(65) Prior Publication Data
US 2018/0115657 A1    Apr. 26, 2018

(30) Foreign Application Priority Data
Oct. 25, 2016   (JP) .................. 2016-208326

(51) Int. Cl.
| G06F 3/12 | (2006.01) |
| H04N 1/00 | (2006.01) |
| G06F 21/60 | (2013.01) |
| G06K 15/00 | (2006.01) |

(52) U.S. Cl.
CPC ....... *H04N 1/00079* (2013.01); *G06F 21/608* (2013.01); *H04N 1/00015* (2013.01); *H04N 1/00061* (2013.01); *G06F 2221/032* (2013.01)

(58) Field of Classification Search
None
See application file for complete search history.

(56) References Cited

U.S. PATENT DOCUMENTS

| 2002/0030841 A1* | 3/2002 | Mitsuhashi ............. G06F 3/033 358/1.13 |
| 2005/0289645 A1 | 12/2005 | Hori |
| 2008/0231888 A1 | 9/2008 | Kuwano |
| 2011/0228304 A1 | 9/2011 | Kuwano |
| 2014/0215356 A1 | 7/2014 | Brander et al. |
| 2014/0375750 A1 | 12/2014 | Yoshida |

FOREIGN PATENT DOCUMENTS

| EP | 1452943 A2 | 9/2004 |
| JP | 2003-066826 | 3/2003 |
| JP | 2005-284375 | 10/2005 |
| JP | 2015-008381 | 1/2015 |

OTHER PUBLICATIONS

Extended European Search Report dated Mar. 16, 2018.

* cited by examiner

*Primary Examiner* — Dov Popovici
(74) *Attorney, Agent, or Firm* — Harness, Dickey & Pierce, P.L.C.

(57) ABSTRACT

An information processing apparatus includes circuitry. The circuitry controls a display to display a symbol corresponding to operation by a user during a first period of time since occurrence of the operation. The circuitry controls output of an image indicating a content displayed on the display to an external apparatus, so as not to output the image to the external apparatus during a second period of time that is equal to or longer than the first period of time.

23 Claims, 10 Drawing Sheets

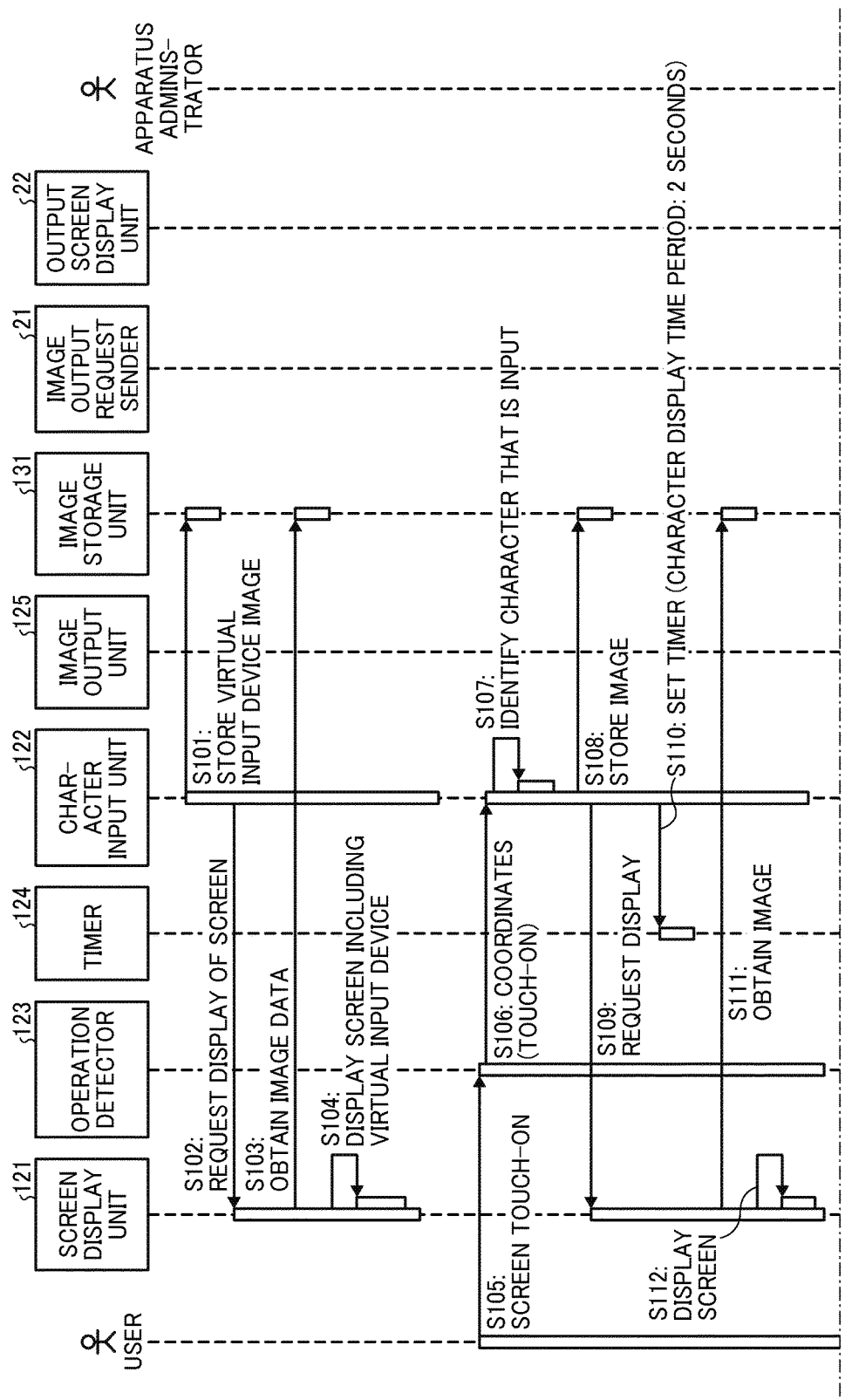

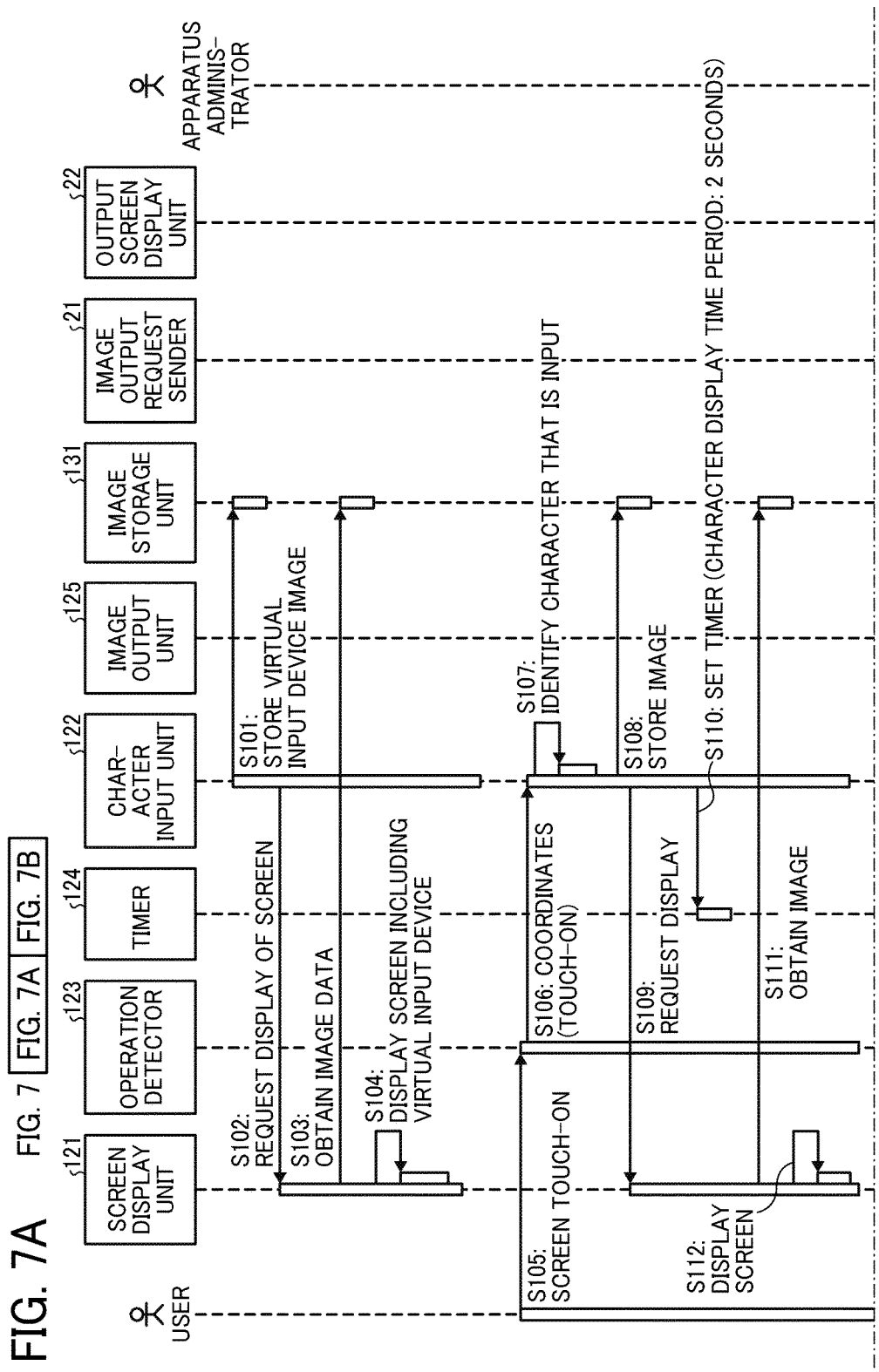

INFORMATION PROCESSING APPARATUS, INFORMATION PROCESSING METHOD, AND NON-TRANSITORY COMPUTER-READABLE STORAGE MEDIUM

CROSS-REFERENCE TO RELATED APPLICATIONS

This patent application is based on and claims priority pursuant to 35 U.S.C. § 119(a) to Japanese Patent Application No. 2016-208326, filed on Oct. 25, 2016 in the Japan Patent Office, the entire disclosure of which is hereby incorporated by reference herein.

BACKGROUND

Technical Field

The present disclosure relates to an information processing apparatus, an information processing method, and a non-transitory computer-readable storage medium.

Description of the Related Art

Conventionally, an image of a screen that is being displayed on a device (e.g., an image forming apparatus) can be displayed on an external computer via a network.

This technique enables to support, for example, troubleshooting of the device from a remote location.

SUMMARY

An information processing apparatus includes circuitry. The circuitry controls a display to display a symbol corresponding to operation by a user during a first period of time since occurrence of the operation. The circuitry controls output of an image indicating a content displayed on the display to an external apparatus, so as not to output the image to the external apparatus during a second period of time that is equal to or longer than the first period of time.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIGS. 4A to 4C are a sequence diagram illustrating an example of a first processing procedure according to the first embodiment of the present disclosure;

FIGS. 7A and 7B are a sequence diagram illustrating an example of a second processing procedure according to the first embodiment of the present disclosure;

Figure 1:
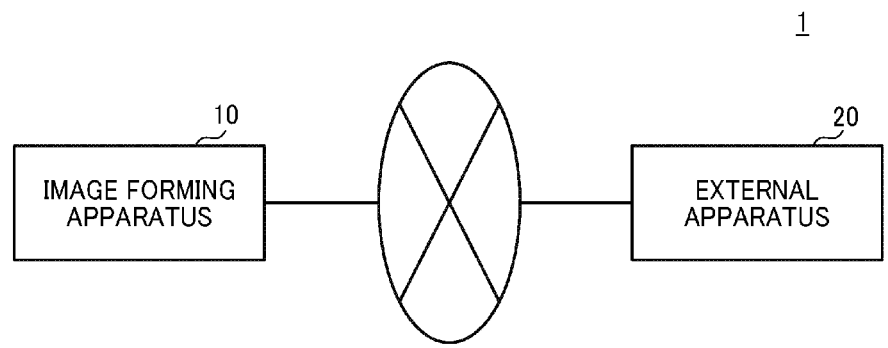
FIG. 1 is a diagram illustrating an example configuration of an information processing system according to a first embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the multiple forms as well, unless the context clearly indicates otherwise.

Referring to the drawings, embodiments of the present disclosure are described.

Hereinafter, a description is given of a first embodiment of the present disclosure, with reference to the drawings. FIG. 1 is a diagram illustrating an example configuration of an information processing system 1 according to a first embodiment of the present disclosure. In FIG. 1, the information processing system 1 includes an image forming apparatus 10 and an external apparatus 20. The image forming apparatus 10 and the external apparatus 20 are connected with each other through a wired or wireless network, such as a local area network (LAN) and the Internet. The image forming apparatus 10 and/or the external apparatus 20 could be more than one.

The image forming apparatus 10 is a multifunction peripheral, which implements two or more functions from among a printer function, a scanner function, a copier function, a facsimile transmission function, etc., in one housing. In another example, a device having any one of those functions may be used as the image forming apparatus 10.

Examples of the external apparatus 20 include a smartphone, a tablet, and a personal computer (PC).

Figure 2:
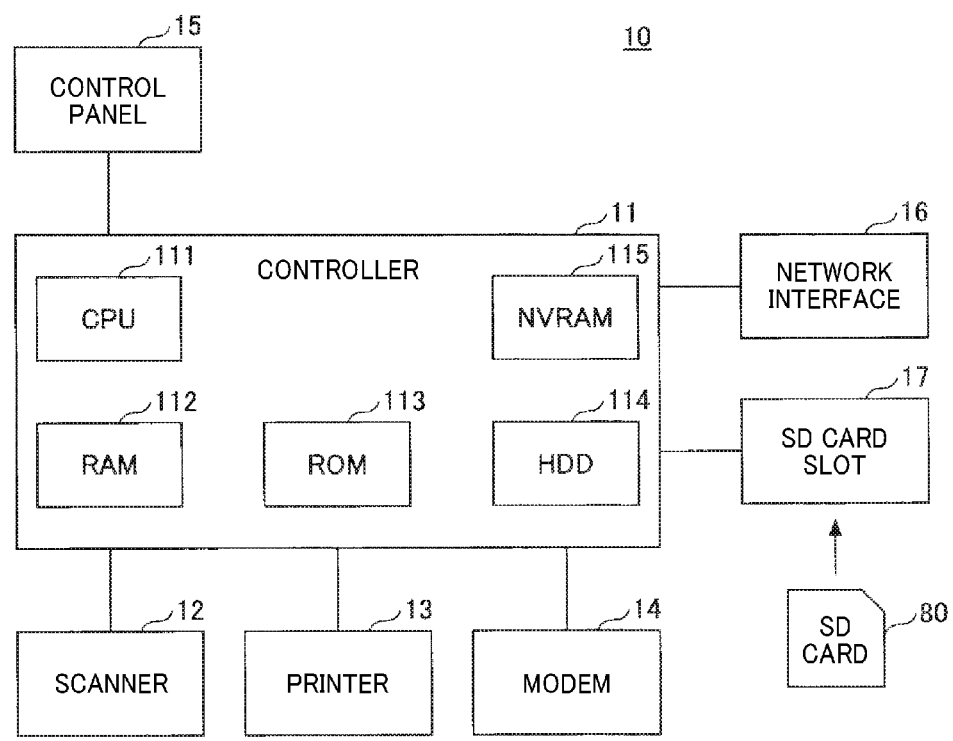
FIG. 2 is a block diagram illustrating an example hardware configuration of an image forming apparatus according to the first embodiment of the present disclosure.

FIG. 2 is a block diagram illustrating an example hardware configuration of the image forming apparatus 10 according to the first embodiment. In FIG. 2, the image forming apparatus 10 includes hardware such as a controller 11, a scanner 12, a printer 13, a modem 14, a control panel 15, a network interface 16, and a secure digital (SD) card slot 17.

The controller 11 includes a central processing unit (CPU) 111, a random access memory (RAM) 112, a read only memory (ROM) 113, a hard disc drive (HDD) 114, and a non-volatile random access memory (NVRAM) 115. The ROM 113 stores various programs and data used by the programs. The RAM 112 is used as a memory area to which a program is loaded or a work area for executing a loaded program. The CPU 111 executes a program loaded to the RAM 112 to implement various functions. The HDD 114 stores programs and various kinds of data used by the programs. The NVRAM 115 stores various kinds of setting information.

The scanner 12 is hardware (image reading device) that scans a document to obtain image data. The printer 13 is hardware (printing device) that forms an image on a printing sheet in accordance with print data. The modem 14 is hardware for connecting to a telephone line, which is used for transmitting and receiving image data by facsimile communication. The control panel 15 is hardware that includes an input device such as keys or buttons that accepts a user input and a display device such as a liquid crystal panel. The liquid crystal panel may have a touch panel function. In this case, the liquid crystal panel also implements a function of input device. The network interface 16 is hardware to connect the image forming apparatus 10 to a wired or wireless network, such as a LAN. The SD card slot 17 is used for reading out programs stored in a SD card 80. Accordingly, in the image forming apparatus 10, not only the programs stored in the ROM 113 but also the programs stored in the SD card 80 may be loaded to the RAM 112 for execution. In addition or in alternative to the SD card 80, any other suitable storage medium may be used, such as a CD-ROM or a universal serial bus (USB) memory. In other words, the type of storage medium corresponding to the SD card 80 is not limited to the predetermined one. In this case, any other suitable hardware is used in alternative to the SD card slot 17 depending on a type of storage medium.

Figure 3:
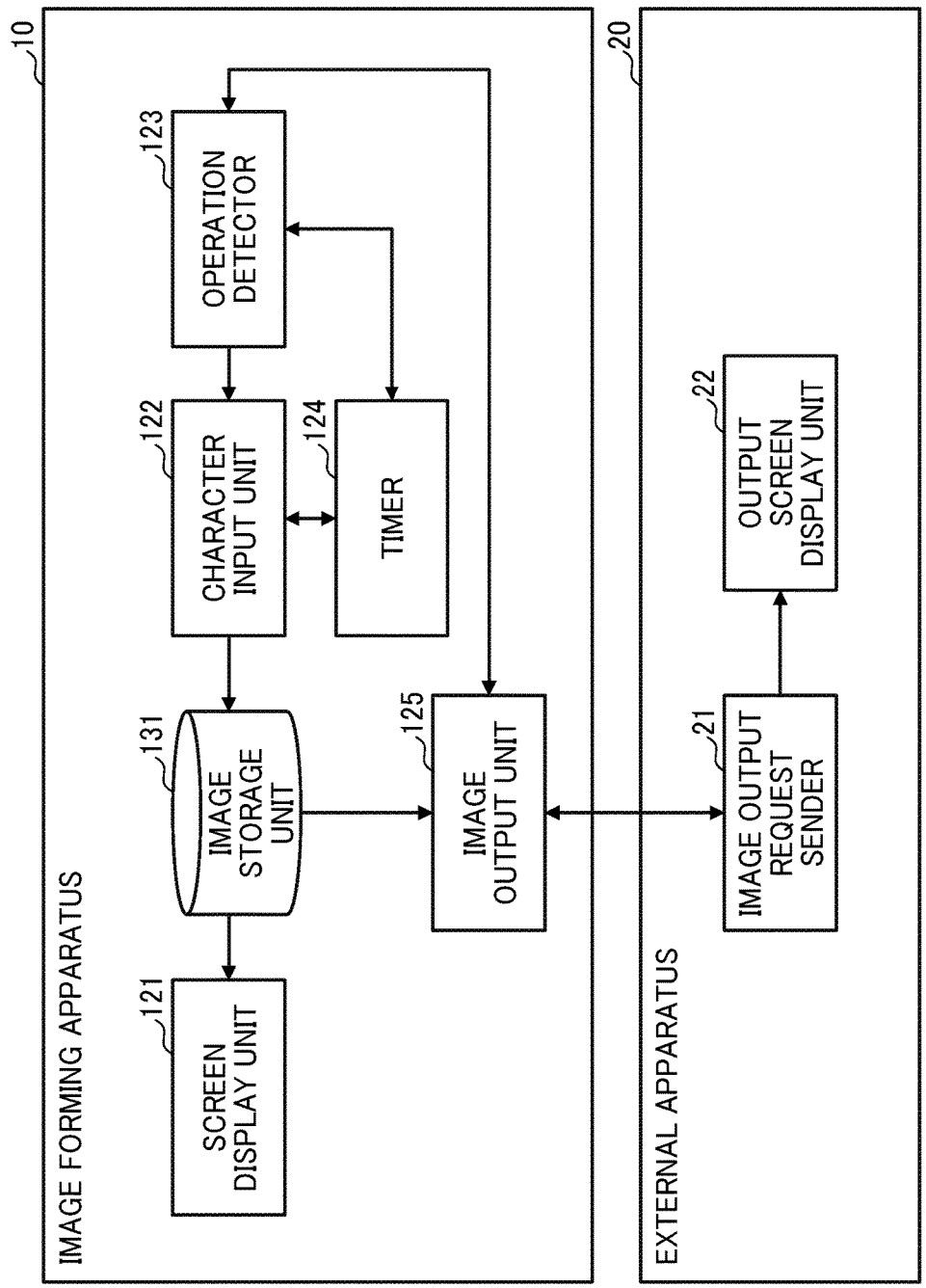
FIG. 3 is a block diagram illustrating functional configurations of the image forming apparatus and an external apparatus according to the first embodiment of the present disclosure.

FIG. 3 is a block diagram illustrating functional configurations of the image forming apparatus 10 and the external apparatus 20 according to the first embodiment. In FIG. 3, the image forming apparatus 10 includes a screen display unit 121, a character input unit 122, an operation detector 123, a timer 124, and an image output unit 125. Each of these functional units is implemented by processes executed by the CPU 111 according to one or more programs installed on the image forming apparatus 10. The image forming apparatus 10 further includes an image storage unit 131.

The image storage unit 131 stores image data corresponding to one screen to be displayed on the control panel 15. For example, a video RAM (VRAM) may be used as the image storage unit 131. In another example, the image storage unit 131 may be implemented by the RAM 112 or a dedicated memory other than the RAM 112.

The screen display unit 121 displays an image represented by image data stored in the image storage unit 131 on the control panel 15.

The character input unit 122 generates image data based on which a virtual input device is displayed on a screen, and stores the generated image data in the image storage unit 131. The character input unit 122 also enters a symbol corresponding to operation to the virtual input device into a destination field of symbols. In the following description, for the sake of explanatory convenience, symbols may be referred to as characters.

The operation detector 123 detects user operation of a screen such as the virtual input device and the coordinates of a position specified by such user operation. For example, the operation detector 123 detects a user's touch-on and touch-off to and from a screen. The operation detector 123 also detects coordinates of the touched position. The operation detector 123 also detects whether a screen is currently being operated by a user. In this disclosure, the virtual input device is a so-called virtual keyboard, screen keyboard, or software keyboard, for example. The virtual input device may include a screen having an area that accepts inputs drawn by hand. The touch-on means that a user's finger or the like is brought into contact with a screen. The touch-off means that a user's finger or the like is removed (separated) from a screen, that is, termination of a touch state. In other words, the period from the touch-on to the touch-off is a period during which a user's finger or the like is kept in contact with a screen.

The timer 124 measures the lapse of preset time.

In response to a request from the external apparatus 20, the image output unit 125 outputs (transmits) image data stored in the image storage unit 131 to the external apparatus 20 through a network.

On the other hand, the external apparatus 20 includes an image output request sender 21 and an output screen display unit 22. Each of these functional units is implemented by processes executed by a CPU of the external apparatus 20 according to one or more programs installed on the external apparatus 20.

The image output request sender 21 sends a request for output of image data representing a screen as a current display target to the image forming apparatus 10, and receives the image data from the image forming apparatus 10.

The output screen display unit 22 displays a screen represented by the image data received by the image output request sender 21 on the external apparatus 20. In one example, the image forming apparatus 10 includes a function of a web server, and the image output request sender 21 and the output screen display unit 22 is implemented by a web browser of the external apparatus 20. In this case, in accordance with a user instruction input to the web browser, the web browser sends a request for output of image data representing a screen as a current display target to the image forming apparatus 10. In response to receiving the request through the web server, the image output unit 125 sends image data stored in the image storage unit 131 to the web browser through the web server. The web browser receives the image data transmitted from the image forming apparatus 10 as a response, and displays a screen represented by the received image data.

Figure 4B:
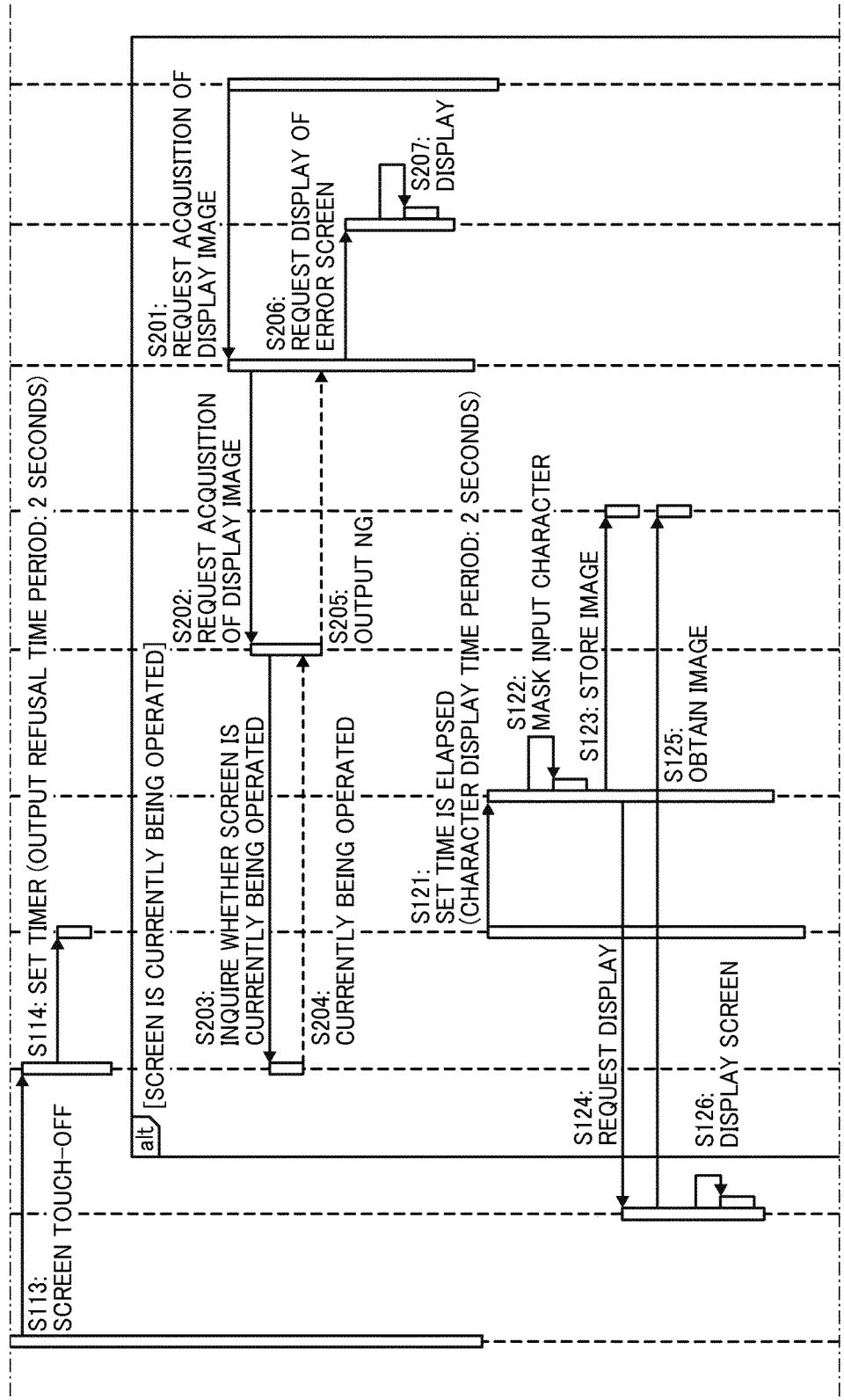
Figure 4C:
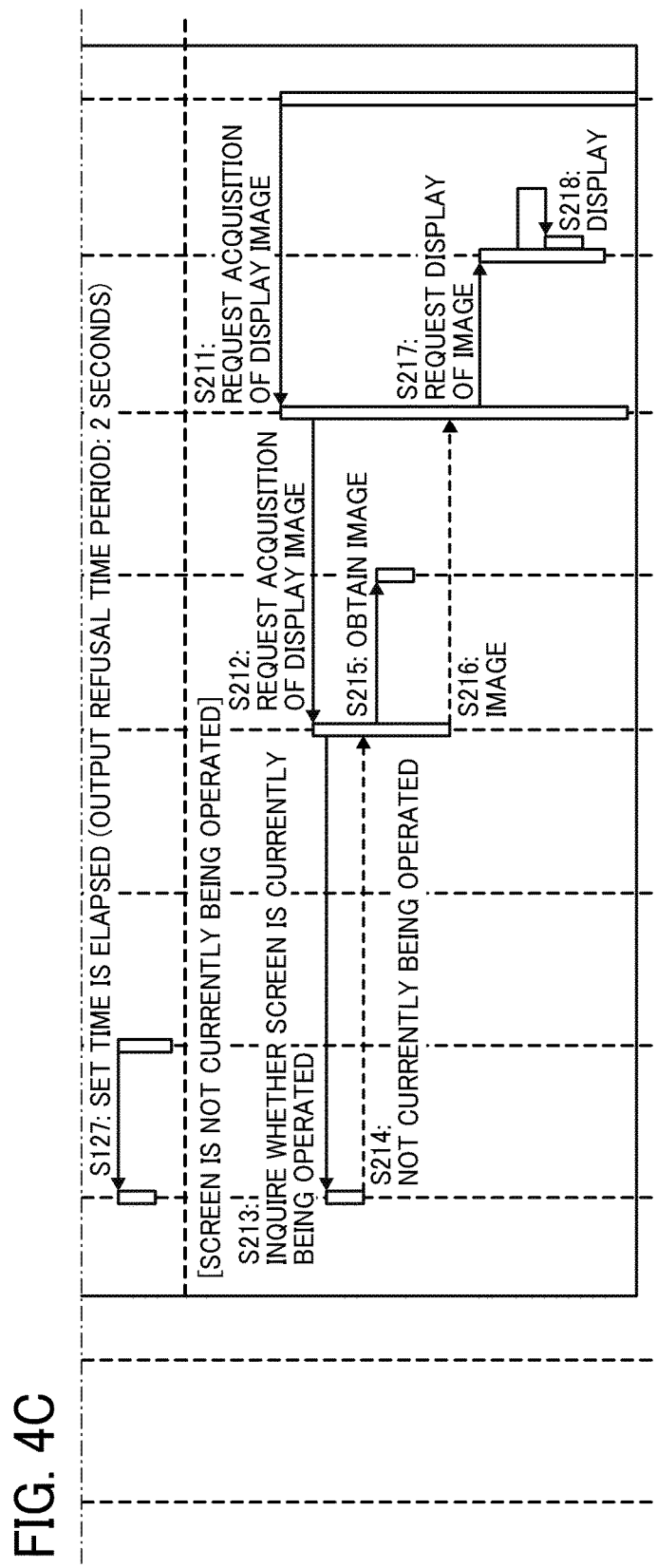

Hereinafter, a description is given of processes performed by the information processing system 1. FIGS. 4A to 4C are a sequence diagram illustrating an example of a first processing procedure according to the first embodiment.

A description is given hereinafter assuming that a login screen is displayed on the control panel 15. For example, the login screen is a screen including a user name entry field and a password entry field.

For example, in response to a user instruction for entering characters into the user name entry field or the password entry field, the character input unit 122 stores image data of the login screen to which virtual input device is added, in the image storage unit 131 (S101). Subsequently, the character input unit 122 requests the screen display unit 121 to display a screen (S102).

In response to this request, the screen display unit 121 obtains the image data from the image storage unit 131 (S103). The screen display unit 121 displays a screen (the login screen and the virtual input device) represented by the obtained image data on the control panel 15 (S104).

Next, when the user touches a given position (key) of the virtual input device (S105), the operation detector 123 notifies the character input unit 122 of the occurrence of touch-on (start of touch) and a coordinate of the touched position (S106). The coordinate of the touched position will be referred to as "operation coordinate" hereinafter. The character input unit 122 identifies the entered character based on the operation coordinate (S107). For example, this identification of entered character is implemented by checking the coordinate of touched position against a coordinate of each character in the virtual input device.

Next, the character input unit 122 stores, in the image storage unit 131, image data obtained by synthesizing the entered character (referred to as an "input character", hereinafter) with image data as the current display target (that is, image data that is currently stored in the image storage unit 131) (S108). The input character is synthesized at a position corresponding to an input position on the login screen. Subsequently, the character input unit 122 requests the screen display unit 121 to display a screen (S109). Further, the character input unit 122 sets, to the timer 124, two seconds as a measurement target (S110). Accordingly, the timer 124 starts measuring two seconds. This period of two seconds is a length of time during which the input character is displayed as it is. This length of time is referred to as an "input character display period", hereinafter. After the input character display period has elapsed, the input character is masked. For example, the mask means replacing the input character with a symbol "*" to hide the input character.

On the other hand, in response to the request for displaying a screen, the screen display unit 121 obtains image data from the image storage unit 131 (S111). The screen display unit 121 displays an image represented by the obtained image data on the control panel 15 (S112). As a result, the login screen as illustrated in FIG. 5 is displayed.

Figure 5:
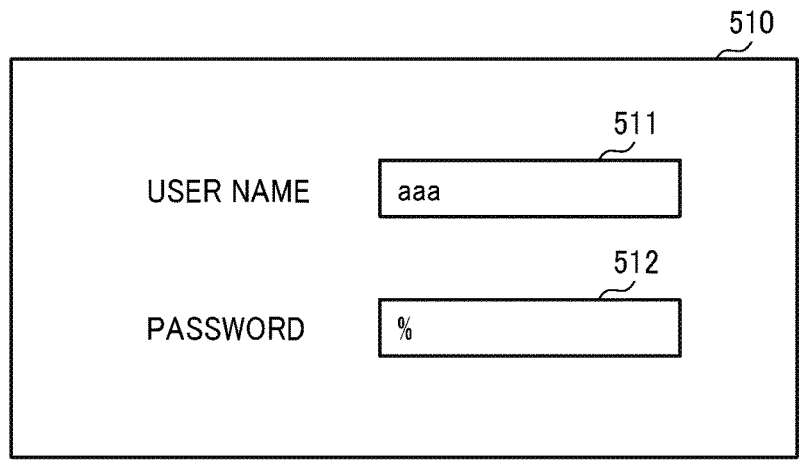
FIG. 5 is an illustration of a display example of a login screen according to an embodiment of the present disclosure.

FIG. 5 illustrates an example of a first display state of a login screen 510. In FIG. 5, the login screen 510 includes a user name entry field 511 and a password entry field 512.

In this example, it is assumed that a character "%" is the input character to the password entry field 512. In other word, FIG. 5 illustrates the login screen 510 displayed immediately after the character "%" is entered through the virtual input device. It should be noted that although in fact the virtual input device is also displayed on the control panel 15, the virtual input device is omitted in FIG. 5, in order to simplify the drawing.

When the user's touch is canceled (the user stops touching the screen), the operation detector 123 detects the cancellation of touch. In response to detecting the cancellation of touch, the operation detector 123 sets two seconds as a measurement target to the timer 124 (S114). This period of two seconds is a length of time during which the image data as the display target is refused to be output to the outside. This length of time is referred to as an "output refusal period", hereinafter. As described above, the input character display period is two seconds. Accordingly, in the present embodiment, the output refusal period is set to a length of time equal to the input character display period. In a case in which touch operation is continuously performed, there is possibility that the operation detector 123 detects the cancellation of (n+1)-th touch before the elapse of the output refusal period that is set to the timer 124 for the cancellation of n-th touch. In this case, the operation detector 123 instructs the timer 124 to reset (cancel) the measurement of output refusal period that is already set, and newly sets two seconds as the output refusal period. In this case, the timer 124 stops measuring the output refusal period that is set for the cancellation of n-th touch, and starts measuring the output refusal period that is newly set for the cancellation of (n+1)-th touch.

In another example, the output refusal period is set to the input character display period+α, which is a length of time obtained by adding a margin to the input character display period (that is, length of time longer than the input character display period). For example, when α=1, the output refusal period is set to three seconds. In other words, the output refusal period is set to any suitable length of time, provided that it is equal to or longer than the input character display period.

When the output refusal period is set to a length of time that is longer than the input character display period, the following risks can be avoided.

As one example of possible risks, when the touch-off from the screen (S113) is detected during the processes from S106 to S109, the timer setting at S114 can be performed before the timer setting at S110. More specifically, in a case in which the process (S106-S112) executed in response to the touch-on (S105) and the process (S114) executed in response to the touch-off (S113) are implemented respectively in different threads, the both processes are executed concurrently. This can cause the latter process to overtake the former process. As a result, there is a risk that the output refusal period ends earlier than the input character display period, and therefore image data containing characters is transmitted to the external apparatus 20.

As another example of possible risks, when the timer setting at S114 and the timer setting at S110 are executed simultaneously, the output refusal period and the input character display period end at the same time. That is, the notification of elapse of the setting time at S121 and S127 are executed at the same time. At this point of time, the processes (that is, masking of the input character) of S122 and the S123 that are executed in response to S121 are not executed yet. This means that image data containing a character that is not masked is stored in the image storage unit 131. Accordingly, there is a risk that the image data containing a character that is not masked is transmitted to the external apparatus 20 during the processes from S122 and S123. This is because the operation detector 123 only determines whether the screen is being currently operated in response to the timer notification, and does not follow the status of the masking process (S122-S123) applied to the input character.

The possibility of occurrence of these two phenomena basically depends on the processing speed of S107 and S108, or, S122 and S123. In other words, the faster the drawing performance, the shorter the length of α can be set.

For example, different values of a for a plurality of models of the image forming apparatus 10 may be recorded (coded) in a program that causes the image forming apparatus 10 to function as the operation detector 123. In this case, when the program is installed onto the image forming apparatus 10, the operation detector 123 implemented by the program acquires model information of the image forming apparatus 10 onto which the program is installed, to determine α corresponding to the model and store the determined value of α in a setting file or the like.

In another example, before the timer setting at S114, the operation detector 123 acquires performance indicators such as a CPU usage rate to dynamically determine α depending on values of a stored in association with performance indicators in the image forming apparatus 10. For example, when the CPU usage rate before the timer setting at S114 is lower than 20%, α is set to 0.5 seconds. When the CPU usage rate is from 20% to 50%, α is set to 1 second, for example. When the CPU usage rate is higher than 50%, α is set to 2 seconds, for example.

In still another example, the value of a may be set arbitrarily by a user via a setting screen or the like.

It is assumed that after S114, a request for acquisition of a display image is input to the external apparatus 20 by a device administrator during the output refusal period (S201). In response to this input, the image output request sender 21 of the external apparatus 20 sends a request for acquisition of display image to the image forming apparatus 10 (S202). In response to receiving this acquisition request, the image output unit 125 of the image forming apparatus 10 inquires of the operation detector 123 whether or not a screen is currently being operated (S203).

The operation detector 123 sends a response indicating that the screen is currently being operated, because at this point of time, the operation detector 123 does not yet receive a notification indicating elapse of the output refusal period (two seconds) from the timer 124 (S204). In other words, although in fact the touch operation has ended, the response indicating that the screen is currently being operated is sent until the output refusal period elapses. Based on the response, the image output unit 125 sends a response indicating that the image output can not be performed (output NG) to the external apparatus 20 (S205). In response to receiving the response, the image output request sender 21 of the external apparatus 20 requests the output screen display unit 22 to display an error screen (S206). In response to the request, the output screen display unit 22 displays an error screen indicating that image data could not be acquired on the external apparatus 20 (S207).

Thereafter, when two seconds as the input character display period has elapsed, the timer 124 notifies the character input unit 122 of the elapse of the two seconds (the end of the input character display period) (S121). In response to the notification, the character input unit 122 applies a mask to an input character included in image data as a current display target (that is, image data that is currently stored in the image storage unit 131) (S122). For example, image data is generated in which an input character(s) is replaced with a symbol "*". Subsequently, the character input unit 122 stores the generated image data in the image storage unit 131 (S123). Next, the character input unit 122 requests the screen display unit 121 to display a screen (S124). In response to the request for displaying a screen, the screen display unit 121 obtains image data from the image storage unit 131 (S125). The screen display unit 121 displays an image represented by the obtained image data on the control panel 15 (S126). As a result, the login screen 510 as illustrated in FIG. 6 is displayed.

Figure 6:
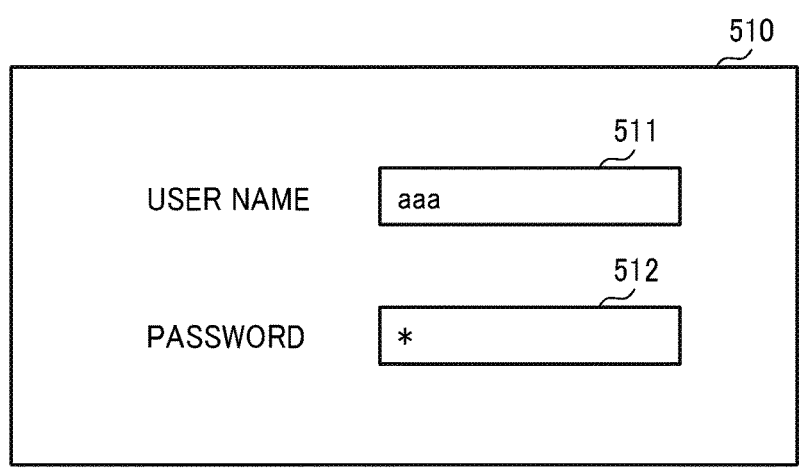
FIG. 6 is an illustration of another display example of the login screen according to an embodiment of the present disclosure.

FIG. 6 is an illustration of another display example of the login screen 510. In FIG. 6, the input character "%" is replaced with "*".

Further, when two seconds as the output refusal period has elapsed, the timer 124 notifies the operation detector 123 of the elapse of the two seconds (the end of the output refusal period) (S127).

When a request for acquisition of a display image is input to the external apparatus 20 after the end of output refusal period (S211), the same or substantially the same processes as those of S202 and S203 are performed at S212 and S213. In this case, because the output refusal period has ended, the operation detector 123 sends a response indicating that a screen is not currently being operated (non-operation) (S214). In response to this response, the image output unit 125 obtains image data from the image storage unit 131 (S215). Subsequently, the image output unit 125 transmits (outputs) the obtained image data to the external apparatus 20 (S216). This image data is image data including, as drawing elements, the login screen 510 as illustrated in FIG. 6 and the virtual input device, for example.

In response to receiving the image data, the image output request sender 21 of the external apparatus 20 requests the output screen display unit 22 to display a screen based on the received image data (S217). The output screen display unit 22 displays an image based on the received image data on the external apparatus 20 (S218). As a result, an image that is currently being displayed on the image forming apparatus 10 is displayed on the external apparatus 20.

A description is given hereinafter of a case in which a request for acquisition of a display image is transmitted from the external apparatus 20 during the period from the occurrence of touch-on until the touch-off occurs. In other words, a description is given of a case in which a request for acquisition of a display image is transmitted from the external apparatus 20 during the processes from S105 to S113.

Figure 7B:
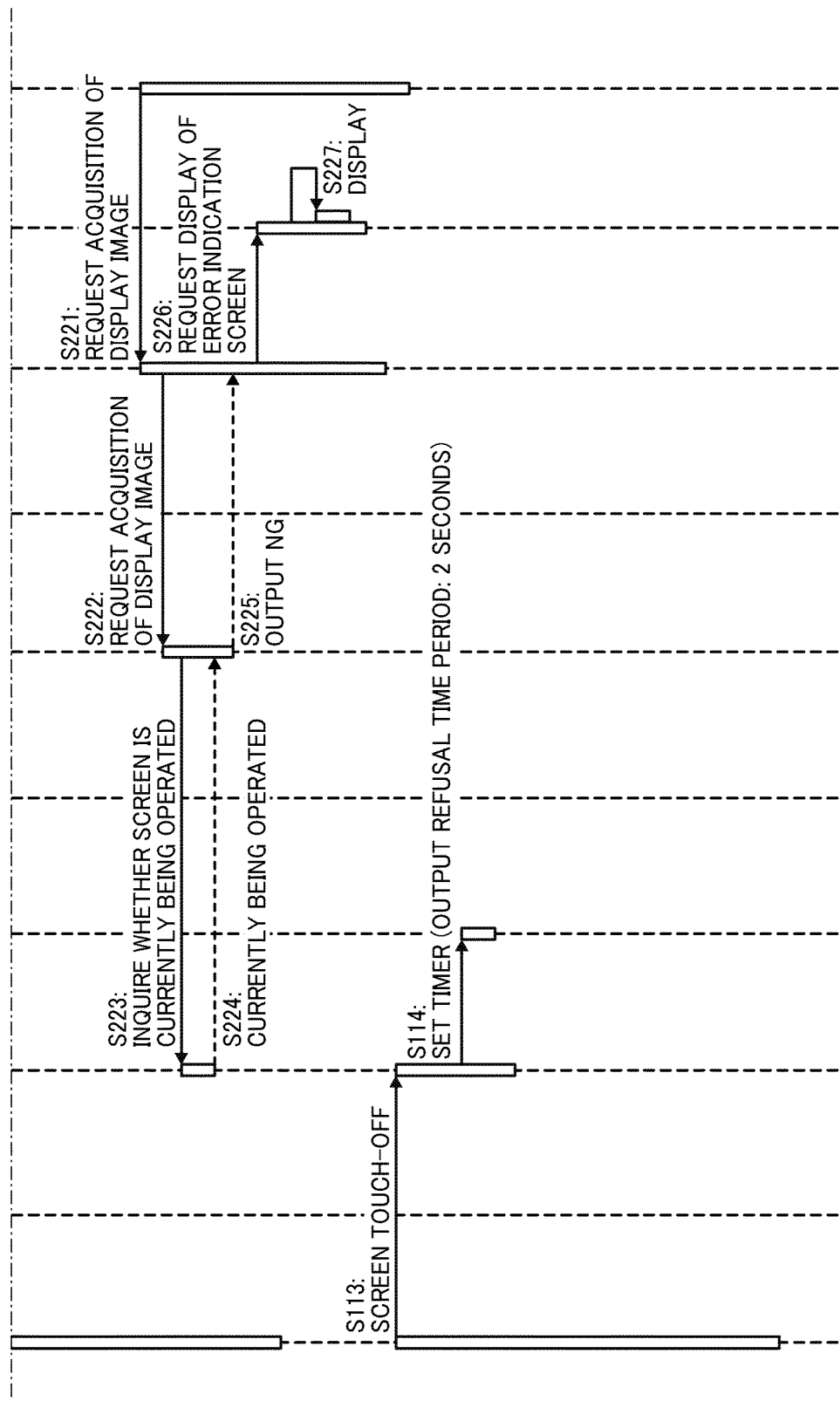

FIGS. 7A and 7B are a sequence diagram illustrating an example of a second processing procedure according to the first embodiment. In FIGS. 7A and 7B, the same step numbers are allocated to the same processes as those in the sequence diagram of FIGS. 4A to 4C, and redundant descriptions thereof are omitted below.

When a request for acquisition of a display image is input to the external apparatus 20 during the period from when the virtual input device is touched until the touch is canceled (S221), the same or substantially the same processes as those of S202 and S203 are performed at S222 and S223.

Because no touch-off is detected after the detection of touch-on, the operation detector 123 sends a response indicating that a screen is not currently being operated even when it is not during the output refusal period (S224). As a result, the same or substantially the same processes as those of S205 to S207 are performed at S225 to S227.

In other words, in the first embodiment, the output of image data is refused also while the touch continues (while the screen is being operated).

As described heretofore, according to the first embodiment, the output of image data that is being displayed on the control panel 15 is refused not only while the screen is being operated but also during a predetermined period after the end of operation (cancel of touch), e.g., until the termination of the output refusal period. This prevents image data of the login screen 510 as illustrated in FIG. 5, for example, from being output to the outside. In other words, security information that is being displayed is prevented from being output to the outside even after the end of operation. Thus, it is possible to prevent deterioration of security caused by outputting an image that is being displayed to the outside.

Hereinafter, a description is given of a second embodiment of the present disclosure. In the second embodiment, a description is given of elements, members, components, or operations that are different from those of the first embodiment. In other words, elements, members, components, or operations of which description are omitted below may be the same or substantially the same as those of the first embodiment.

Figure 8:
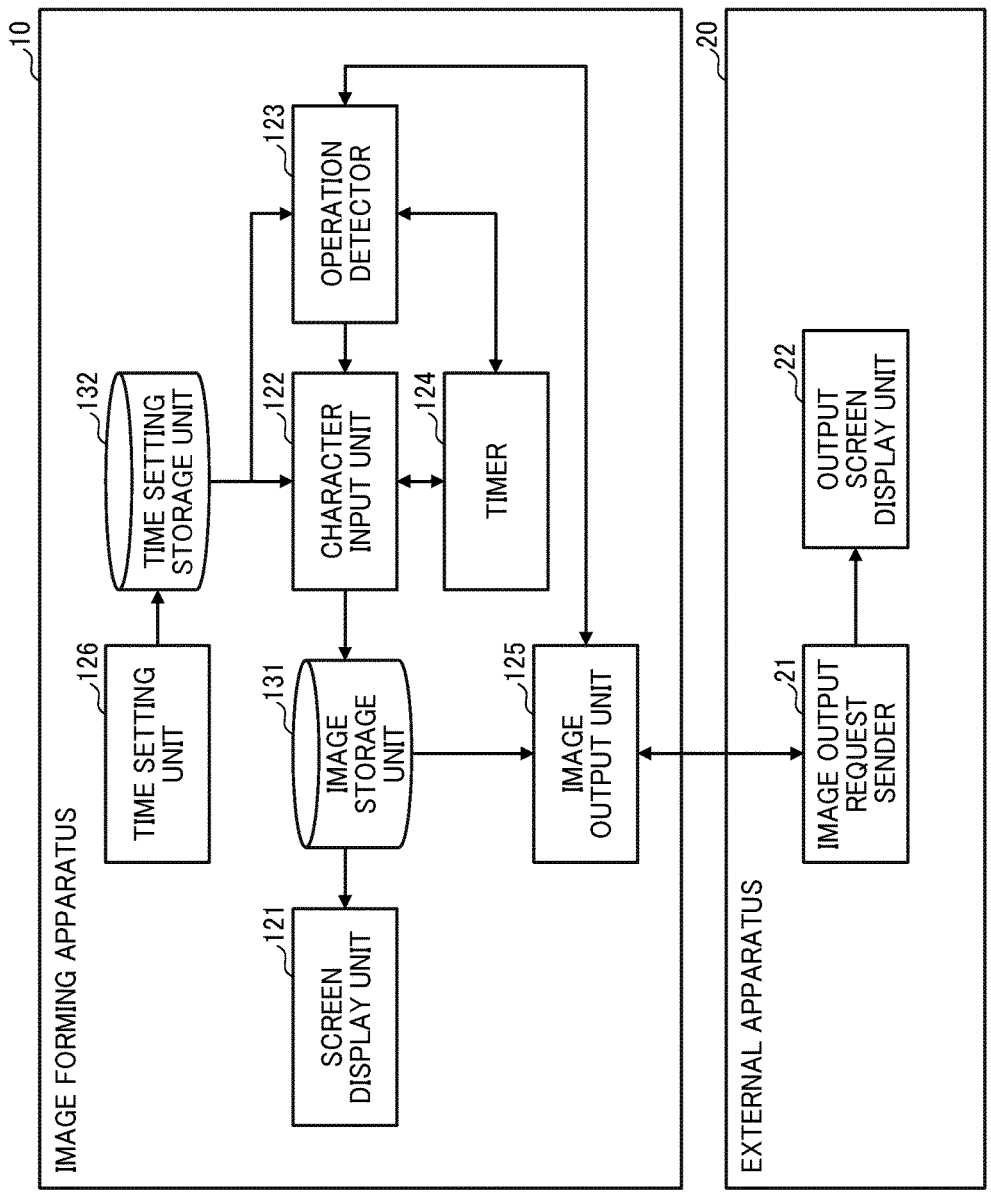
FIG. 8 is a block diagram illustrating functional configurations of the image forming apparatus and the external apparatus according to a second embodiment of the present disclosure.

FIG. 8 is a block diagram illustrating functional configurations of the image forming apparatus 10 and the external apparatus 20 according to the second embodiment. In FIG. 8, the same reference numbers are allocated to the same functional units as those of FIG. 3, and redundant descriptions thereof are omitted below.

In FIG. 8, the image forming apparatus 10 further includes a time setting unit 126. The time setting unit 126 is implemented by processes executed by the CPU 111 according to one or more programs installed on the image forming apparatus 10. The image forming apparatus 10 further includes a time setting storage unit 132. The time setting storage unit 132 is implemented by, for example, an internal storage device of the image forming apparatus 10, such as the HDD 114, or a storage device connected to the image forming apparatus 10 via a network.

The time setting unit 126 accepts a user instruction for setting the input character display period though the control panel 15. In another example, the time setting unit 126 receives a request for setting the input character display period from a computer that is connected to the image forming apparatus 10 via a network. The time setting unit 126 stores the input character display period that is set in the time setting storage unit 132. In other words, while the input character display period is fixed in the first embodiment, the input character display period can be changed in the second embodiment.

More specifically, at S110 of FIG. 4A, the character input unit 122 sets the input character display period stored in the time setting storage unit 132 to the timer 124.

Further, at S114 of FIG. 4B, the operation detector 123 sets, as the output refusal period, a length of time that is determined based on the input character display period stored in the time setting storage unit 132 (the input character display period+α) to the timer 124. Any suitable value is used as α, provided that it is larger than 0. In another example, the time setting unit 126 also accepts an instruction for setting the output refusal period and stores the output refusal period that is set in the time setting storage unit 132. In this case, the operation detector 123 may set the output refusal period that is stored in the time setting storage unit 132 to the timer 124.

As described above, the second embodiment enables to change the input character display period and/or the output refusal period.

Hereinafter, a description is given of a third embodiment of the present disclosure. In the third embodiment, a description is given of elements, members, components, or operations that are different from those of the first embodiment. In other words, elements, members, components, or operations of which description are omitted below may be the same or substantially the same as those of the first embodiment.

Figure 9:
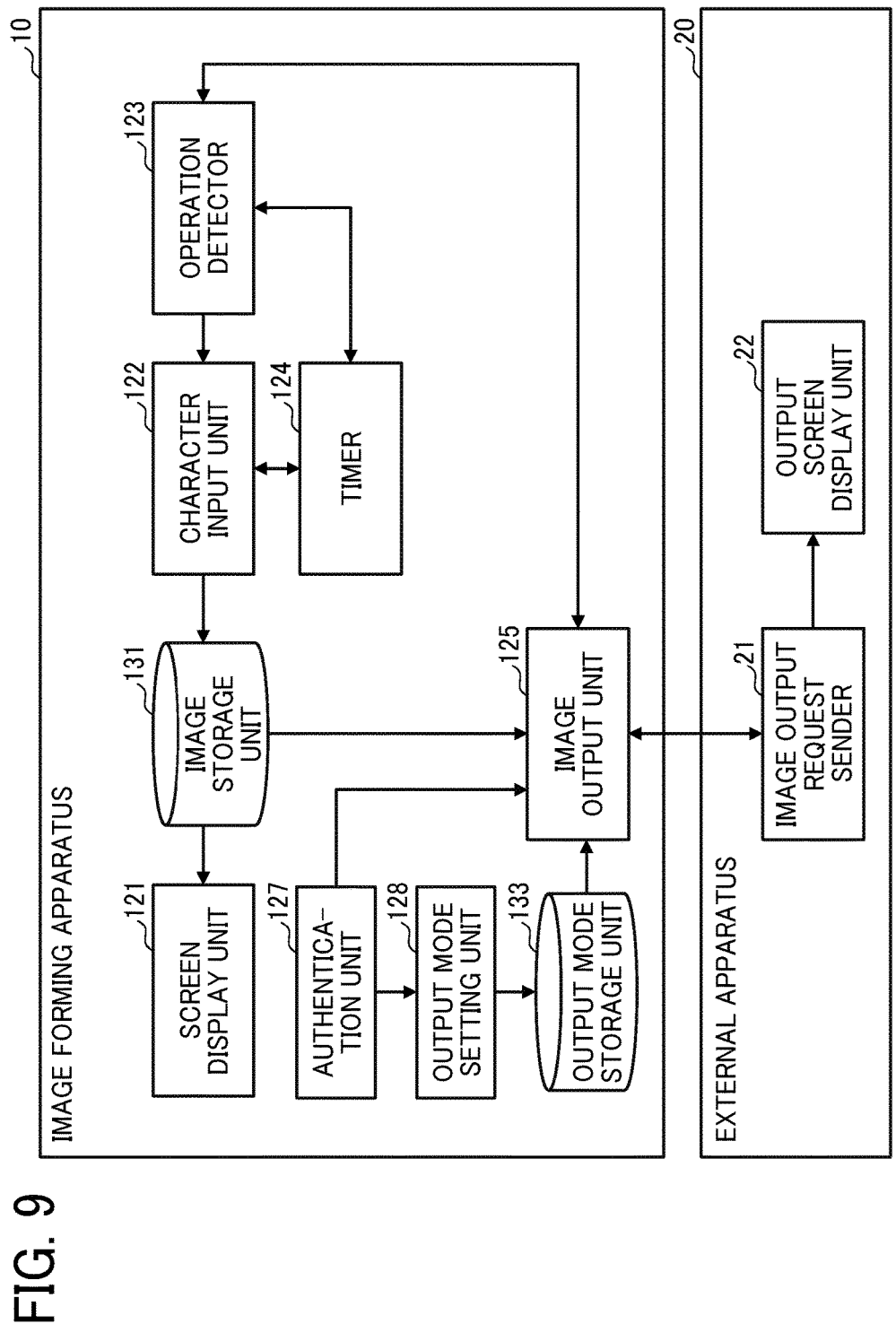
FIG. 9 is a block diagram illustrating functional configurations of the image forming apparatus and the external apparatus according to a third embodiment of the present disclosure.

FIG. 9 is a block diagram illustrating functional configurations of the image forming apparatus 10 and the external apparatus 20 according to the third embodiment. In FIG. 9, the same reference numbers are allocated to the same functional units as those of FIG. 3, and redundant descriptions thereof are omitted below.

In FIG. 9, the image forming apparatus 10 further includes an authentication unit 127 and an output mode setting unit 128. Each of these functional units is implemented by processes executed by the CPU 111 according to one or more programs installed on the image forming apparatus 10. The image forming apparatus 10 further includes an output mode storage unit 133. The output mode storage unit 133 is implemented by, for example, an internal storage device of the image forming apparatus 10, such as the HDD 114, or a storage device connected to the image forming apparatus 10 via a network.

The authentication unit 127 performs a user authentication of the image forming apparatus 10 to permit an authenticated user to log in the image forming apparatus 10. The image forming apparatus 10 of the first and second embodiments may also include the authentication unit 127.

The output mode setting unit 128 accepts settings (setting of an output mode) for the validity of image output function in a state in which the image forming apparatus 10 is being operated by a predetermined user. The output mode setting unit 128 stores the output mode that is set in the output mode storage unit 133.

In this embodiment, the predetermined user is a service engineer. The service engineer is a person in charge of maintenance work of the image forming apparatus 10. Further, the image output function is a function of outputting image data stored in the image storage unit 131 to the outside. The validity of image output function (output mode) is a setting concerning whether to enable (ON) or disenable (OFF) the image output function. When the output mode is ON, the setting includes partial ON and all ON. When the output mode is partial ON, the image output function is disenabled during operation and the predetermined period after the end of operation, as described in the first embodiment. When the output mode is all ON, the image output function is enabled in all periods. Accordingly, when the output mode is all ON, image data stored in the image storage unit 131 is permitted to be output to the outside during operation and the predetermined period after the end of operation.

In other words, there is a case that the output of image data is to be permitted in any periods of operation performed by a service engineer for maintenance work. The third embodiment enables to configure settings for the output mode in view of such case.

In one example, only a service engineer or a device administrator is permitted to configure settings for the output mode.

Hereinafter, a description is given of processes according to the third embodiment. Redundant description are omitted below of processes that are the same or the substantially the same as those of the first embodiment.

When a user who has successfully logged in the image forming apparatus 10 is a service engineer, the authentication unit 127 notifies the image output unit 125 that the image forming apparatus 10 is currently in a service engineer mode. The user who has successfully logged in the image forming apparatus 10 is referred to as a "login user" hereinafter. The service engineer mode indicates that the image forming apparatus 10 is operated by a service engineer. For example, it may be determined whether or not the login user is a service engineer based on whether information indicating the service engineer is added to a user name and password corresponding to the service engineer is stored in a storage unit in which correct user names and passwords are stored.

In response to receiving a notification that the image forming apparatus 10 is currently in the service engineer mode, the image output unit 125 performs processes according the output mode stored in the output mode storage unit 133. In other words, when the image forming apparatus 10 is not in the service engineer mode, the same processes as those of the first embodiment are performed.

When the image forming apparatus 10 is in the service engineer mode, the processes at S205 and S216 of FIG. 4B and the process at S225 of FIG. 7B vary depending on the output mode.

More specifically, when the output mode is OFF, the image output unit 125 does not output image data at S216.

When the output mode is all ON, the image output unit 125 outputs image data at S205 and S225.

When the output mode is partial ON, the image output unit 125 performs processes as described in the first embodiment.

Although a description is given heretofore of a case in which a service engineer is the predetermined users, a user other than a service engineer such as a device administrator may be the predetermined user.

As described heretofore, according to the third embodiment, image data can be output even while a screen is being operated and during a predetermined period after the end of operation, in a state in which screen is being operated by the predetermined user. The third embodiment may be combined with the second embodiment.

In the above embodiments, the control panel 15 may be implemented by an information processing terminal such as a smartphone or a tablet, in alternative to hardware that includes a display device and an input device. The information processing terminal may be fixed to the controller 11 or detachable from the controller 11.

In this case, the functional units of image forming apparatus 10 in FIG. 3, FIG. 8 and FIG. 9 may be implemented by a program installed on the information processing terminal. In this case, the information processing terminal and the external apparatus 20 may communicate data directly with each other or via the controller 11.

Further, the above embodiments may be applied to an information processing apparatus other than the image forming apparatus 10. For example, the above embodiments may be applied to a projector, an electronic whiteboard, a videoconference system, or a personal computer.

Furthermore, although in the above embodiments a description is given of a case in which characters are entered using the virtual input device, alternatively hardware such as a keyboard or a mouse may be used. In this case, the operation detector 123 detects operation to hardware such as a keyboard or a mouse.

The image data to be output to the outside may be still image data or video data.

In the above embodiments, the image forming apparatus 10 is an example of an information processing apparatus. The control panel 15 is an example of a display unit. The character input unit 122 and the screen display unit 121 are an example of a display control unit. The image output unit 125 is an example of an output unit. The time setting unit 126 is an example of a setting unit. The operation detector 123 is an example of a determination unit. The input character display period is an example of a first period of time. The output refusal period is an example of a second period of time.

According to an embodiment of the present disclosure, it is possible to prevent deterioration of security caused by outputting images being displayed to the outside.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. An information processing apparatus comprising circuitry to:
   control a display to display a symbol corresponding to an operation by a user during a first period of time subsequent to an occurrence of the operation;
   control the display to mask display of the symbol upon the first period of time being elapsed; and
   control output of an image indicating a content displayed on the display to an external apparatus, so as to prevent output of the image to the external apparatus during a second period of time, the second period of time being equal to or longer than the first period of time.

2. The information processing apparatus of claim 1, further comprising a receiver to receive a request for acquisition of the image, the request being transmitted from the external apparatus in response to a user instruction to the external apparatus,
   wherein the circuitry is configured to control the output so as to prevent transmission of the image to the external apparatus in response to the request received by the receiver during the second period of time.

3. The information processing apparatus of claim 1, wherein:
   the circuitry is further configured to detect the occurrence of the operation and an end of the operation;
   wherein the first period of time starts when the occurrence of the operation is detected; and
   the second period of time starts when the end of the operation is detected.

4. The information processing apparatus of claim 2, wherein:
   the circuitry is further configured to detect the occurrence of the operation and an end of the operation;
   wherein the first period of time starts when the occurrence of the operation is detected; and
   the second period of time starts when the end of the operation is detected.

5. The information processing apparatus of claim 1, wherein the circuitry is configured to control the output so as to prevent output of the image to the external apparatus during a period of time from the occurrence of the operation to an end of the operation.

6. The information processing apparatus of claim 2, wherein the circuitry is configured to control the output so as to prevent output of the image to the external apparatus during a period of time from the occurrence of the operation to an end of the operation.

7. The information processing apparatus of claim 1, wherein the circuitry is further configured to:
   accept setting of the first period of time; and
   determine the second period of time based on the setting accepted, of the first period of time, and
   wherein the circuitry is configured to control the output so as to prevent output of the image to the external apparatus during the second period of time determined based on the setting accepted, of the first period of time.

8. The information processing apparatus of claim 1, wherein the circuitry being configured to control the display to mask the symbol, further includes the circuitry being configured to control the display to replace display of the symbol with display of another symbol upon the first period of time being elapsed.

9. An information processing method performed by an information processing apparatus, the method comprising:

controlling a display to display a symbol corresponding to an operation by a user during a first period of time subsequent to occurrence of the operation;

controlling the display to mask display of the symbol upon the first period of time being elapsed; and controlling an output of an image indicating a content displayed on the display to an external apparatus, so as to prevent output of the image to the external apparatus during a second period of time, the second period of time being equal to or longer than the first period of time.

10. The information processing method of claim 9, further comprising:

receiving a request for acquisition of the image, the request being transmitted from the external apparatus in response to a user instruction to the external apparatus, wherein the controlling of the output includes controlling the output so as to prevent transmission of the image to the external apparatus in response to the received request during the second period of time.

11. The information processing method of claim 9, further comprising detecting the occurrence of the operation and an end of the operation, wherein the first period of time starts when the occurrence of the operation is detected, and the second period of time starts when the end of the operation is detected.

12. The information processing method of claim 10, further comprising detecting the occurrence of the operation and an end of the operation, wherein the first period of time starts when the occurrence of the operation is detected, and the second period of time starts when the end of the operation is detected.

13. The information processing method of claim 9, wherein the controlling of the output includes controlling the output so as to prevent output of the image to the external apparatus during a period of time from the occurrence of the operation to an end of the operation.

14. The information processing method of claim 10, wherein the controlling of the output includes controlling the output so as to prevent output of the image to the external apparatus during a period of time from the occurrence of the operation to an end of the operation.

15. The information processing method of claim 9, further comprising:

accepting setting of the first period of time; and determining the second period of time based on the setting accepted, of the first period of time, wherein the controlling of the output includes controlling the output so as to prevent output of the image to the external apparatus during the second period of time determined.

16. The information processing method of claim 9, wherein the controlling of the display to mask of the symbol includes replacing display of the symbol with display of another symbol upon the first period of time being elapsed.

17. A non-transitory computer-executable storage medium storing a computer-executable product that causes a computer to perform an information processing method, the method comprising:

controlling a display to display a symbol corresponding to an operation by a user during a first period of time subsequent to occurrence of the operation;

controlling the display to mask display of the symbol upon the first period of time being elapsed; and controlling an output of an image indicating a content displayed on the display to an external apparatus, so as to prevent output of the image to the external apparatus during a second period of time, the second period of time being equal to or longer than the first period of time.

18. The non-transitory computer-executable storage medium of claim 17, wherein the method further comprises:

receiving a request for acquisition of the image, the request being transmitted from the external apparatus in response to a user instruction to the external apparatus, wherein the controlling of the output includes controlling the output so as to transmit prevent transmission of the image to the external apparatus in response to the received request during the second period of time.

19. The non-transitory computer-executable storage medium of claim 17, wherein the method further comprises detecting the occurrence of the operation and an end of the operation, wherein the first period of time starts when the occurrence of the operation is detected, and the second period of time starts when the end of the operation is detected.

20. The non-transitory computer-executable storage medium of claim 17, wherein the controlling of the output includes controlling the output so as to prevent output of the image to the external apparatus during a period of time from the occurrence of the operation to an end of the operation.

21. The non-transitory computer-executable storage medium of claim 18, wherein the controlling of the output includes controlling the output so as to prevent output of the image to the external apparatus during a period of time from the occurrence of the operation to an end of the operation.

22. The non-transitory computer-executable storage medium of claim 17, wherein the method further comprises:

accepting setting of the first period of time; and determining the second period of time based on the setting accepted, of the first period of time, wherein the controlling of the output includes controlling the output so as to prevent output of the image to the external apparatus during the second period of time determined.

23. The non-transitory computer-executable storage medium of claim 17, wherein the controlling of the display to mask of the symbol includes replacing display of the symbol with display of another symbol upon the first period of time being elapsed.

* * * * *